US007357314B2

(12) United States Patent
Kusakawa

(10) Patent No.: US 7,357,314 B2
(45) Date of Patent: Apr. 15, 2008

(54) VENDING MACHINE, DISPENSE PRODUCT DETERMINATION METHOD, STOCK PRODUCT DETERMINATION METHOD, AND SYSTEM THEREOF, AND CARTRIDGE FOR VENDING MACHINE

(75) Inventor: Sadao Kusakawa, Osaka (JP)

(73) Assignee: Aisel Corporation, Osaka (JP)

(*) Notice: Subject to any disclaimer, the term of this patent is extended or adjusted under 35 U.S.C. 154(b) by 187 days.

(21) Appl. No.: 10/482,050

(22) PCT Filed: Feb. 13, 2003

(86) PCT No.: PCT/JP03/01499

§ 371 (c)(1),
(2), (4) Date: Dec. 29, 2003

(87) PCT Pub. No.: WO2004/036514

PCT Pub. Date: Apr. 29, 2004

(65) Prior Publication Data

US 2004/0232227 A1 Nov. 25, 2004

(30) Foreign Application Priority Data

Oct. 15, 2002 (JP) ............................ 2002-300881
Jan. 20, 2003 (JP) ............................ 2003-010618

(51) Int. Cl.
*G06F 7/08* (2006.01)

(52) U.S. Cl. ...................... 235/381; 235/375; 235/383

(58) Field of Classification Search ................ 235/381, 235/375, 383; 700/231, 233, 241, 242; 705/16
See application file for complete search history.

(56) References Cited

U.S. PATENT DOCUMENTS

| | | | | |
|---|---|---|---|---|
| 3,486,658 | A * | 12/1969 | Cheslak et al. | 221/197 |
| 4,954,697 | A * | 9/1990 | Kokubun et al. | 235/381 |
| 5,025,950 | A * | 6/1991 | Trouteaud et al. | 221/5 |
| 5,303,844 | A * | 4/1994 | Muehlberger | 221/1 |
| 5,822,216 | A * | 10/1998 | Satchell et al. | 700/232 |
| 6,006,947 | A * | 12/1999 | Kano | 221/11 |
| 6,397,193 | B1 * | 5/2002 | Walker et al. | 705/16 |
| 6,751,525 | B1 * | 6/2004 | Crisp, III | 700/241 |
| 6,843,720 | B2 * | 1/2005 | Luciano et al. | 463/16 |

FOREIGN PATENT DOCUMENTS

| | | |
|---|---|---|
| JP | A 01-250195 | 10/1989 |
| JP | A 06-150119 | 5/1994 |
| JP | A 11-31258 | 2/1999 |

* cited by examiner

*Primary Examiner*—Michael G. Lee
*Assistant Examiner*—Kumiko C. Koyama
(74) *Attorney, Agent, or Firm*—Oliff & Berridge, PLC

(57) ABSTRACT

A storage compartment contains a variety of products. In a vending machine, once a product is selected at a product selection part, a dispense product determination part determines a product to dispense based on a selected product data from the product selection part, data on products contained in each storage compartment, and a product dispense rule. If a plurality of storage compartments can dispense a selected product, or, none of the first-to-be-dispensed products in any storage compartments matches the selected product, the vending machine determines a product to dispense based on a given product dispense rule.

20 Claims, 14 Drawing Sheets

FIG. 7

(a)

701

| COMPARTMENT NUMBER | 1 | 2 | 3 | 4 | 5 | 6 |
|---|---|---|---|---|---|---|
| | ⋮ | ⋮ | ⋮ | ⋮ | ⋮ | ⋮ |
| 703 SECOND PRODUCT TO BE DISPENSED | A | A | B | D | C | A |
| 702 FIRST PRODUCT TO BE DISPENSED | A | A | A | B | B | C |

ORDER OF DISPENSING ↑

OPENING (b)

| | |
|---|---|
| SELECTED PRODUCT | B |
| PRODUCT TO BE DISPENSED | B |
| COMPARTMENT TO DISPENSE | 4 |

FIG. 8

(a)

| COMPARTMENT NUMBER | 1 | 2 | 3 | 4 | 5 | 6 |
|---|---|---|---|---|---|---|
| | ⋮ | ⋮ | ⋮ | ⋮ | ⋮ | ⋮ |
| SECOND PRODUCT TO BE DISPENSED | A | A | A | D | E | A |
| FIRST PRODUCT TO BE DISPENSED | A | A | A | B | B | C |

ORDER OF DISPENSING ↑

OPENING (b)

| | |
|---|---|
| SELECTED PRODUCT | B |
| PRODUCT TO BE DISPENSED | B |
| PAST SALES | D>E |
| COMPARTMENT TO DISPENSE | 4 |

FIG. 9

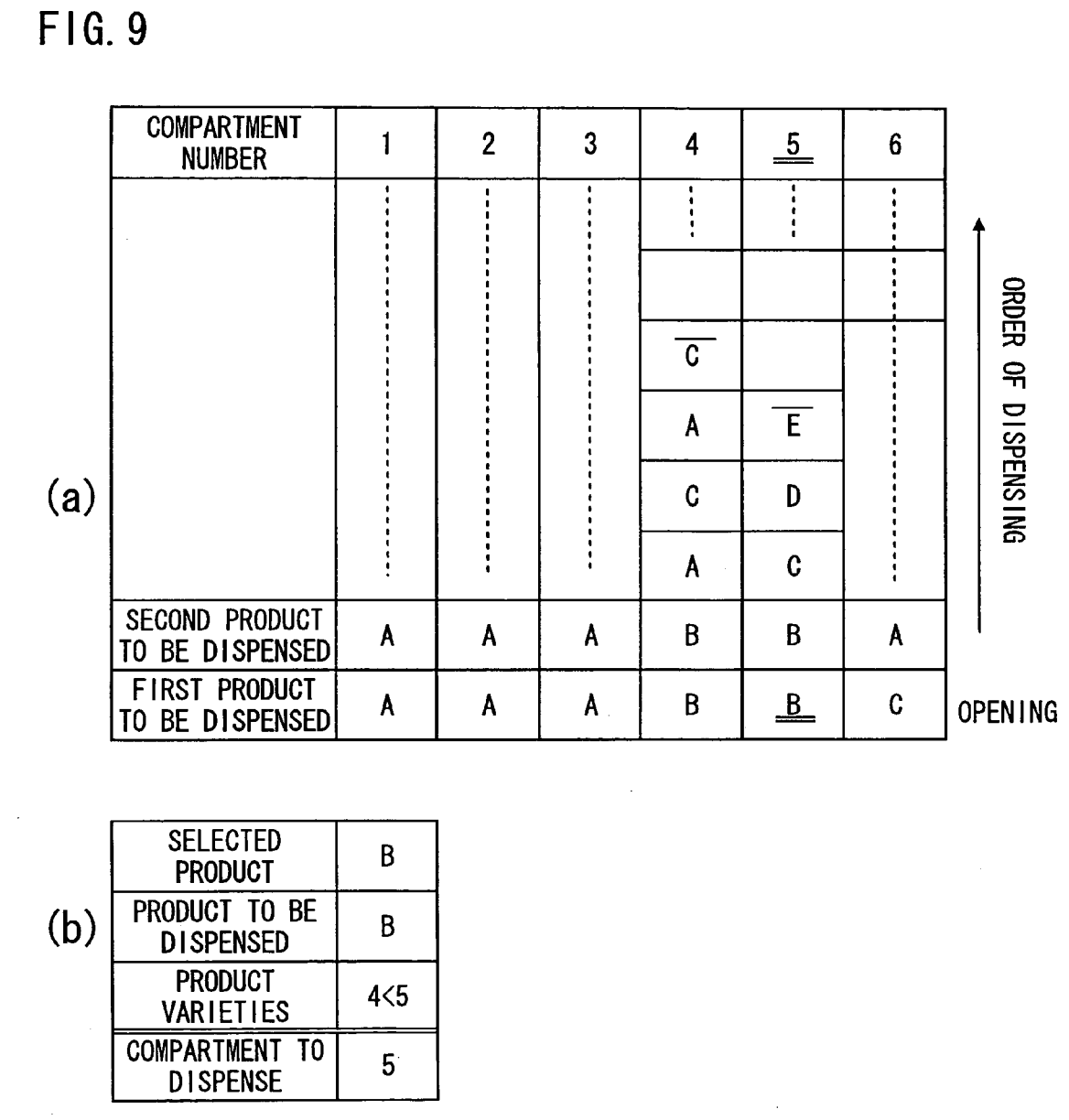

(a)

| COMPARTMENT NUMBER | 1 | 2 | 3 | 4 | 5 | 6 |
|---|---|---|---|---|---|---|
| | | | | | | |
| | | | | | | |
| | | | | $\overline{C}$ | | |
| | | | | A | $\overline{E}$ | |
| | | | | C | D | |
| | | | | A | C | |
| SECOND PRODUCT TO BE DISPENSED | A | A | A | B | B | A |
| FIRST PRODUCT TO BE DISPENSED | A | A | A | B | B | C |

ORDER OF DISPENSING

OPENING (b)

| | |
|---|---|
| SELECTED PRODUCT | B |
| PRODUCT TO BE DISPENSED | B |
| PRODUCT VARIETIES | 4<5 |
| COMPARTMENT TO DISPENSE | 5 |

FIG. 10

(a)

| COMPARTMENT NUMBER | 1 | 2 | 3 | 4 | 5 | 6 |
|---|---|---|---|---|---|---|
| | | | | | | |
| | A | C | B | E | A | B |
| SECOND PRODUCT TO BE DISPENSED | A | A | D | D | C | C |
| FIRST PRODUCT TO BE DISPENSED | A | A | A | B | B | C |

ORDER OF DISPENSING

OPENING (b)

| | |
|---|---|
| SELECTED PRODUCT | D |
| PRODUCT TO BE DISPENSED | 4 |
| COMPARTMENT TO DISPENSE | B, D |

FIG. 14

CARTRIDGE

| | | | | | |
|---|---|---|---|---|---|
| FIFTH ROW | A | A | A | B | C |
| FOURTH ROW | A | A | A | B | B |
| THIRD ROW | A | A | A | B | C |
| SECOND ROW | A | A | A | B | B |
| FIRST ROW | A | A | A | B | C |

PRODUCT DISPENSING

FIG. 15

CARTRIDGE

| | | | | | |
|---|---|---|---|---|---|
| FIFTH ROW | A | A | A | B | C |
| FOURTH ROW | A | A | B | B | A |
| THIRD ROW | A | A | A | B | C |
| SECOND ROW | A | A | B | B | A |
| FIRST ROW | A | A | A | B | C |

PRODUCT DISPENSING

VENDING MACHINE, DISPENSE PRODUCT DETERMINATION METHOD, STOCK PRODUCT DETERMINATION METHOD, AND SYSTEM THEREOF, AND CARTRIDGE FOR VENDING MACHINE

TECHNICAL FIELD

The present invention relates to a vending machine, and a method for determining products to be dispensed, a method for determining products to be stocked and a system of the vending machine. More specifically, the present invention relates to a vending machine in which a single storage compartment contains a plurality of products, and a method for determining products to be dispensed, a method for determining products to be stocked, and a system of the vending machine.

BACKGROUND ART

Vending machines are installed in various places indoors and outdoors and widely used for convenience. Vending machines vend a variety of products including beverages and foods. In order to improve the efficiency of stocking vending machines with products or to increase sales of products at vending machines, vending machines with various features and structures have been proposed and used. For example, a technique that pre-packages products into cartridges and installs the cartridges in a vending machine has been proposed to enhance the efficiency of stocking vending machines with products.

Placing a variety of products into a product storage cabinet divided to rows and columns of compartments requires much care in placing correct products in correct positions, which results in low work efficiency. Therefore, a technique is used that does not directly place products into the product storage cabinet divided to rows and columns of compartments. The technique employs a cartridge which can individually contain products. The products are pre-packaged into the cartridge, and the cartridge is replaceably set in a cartridge storage frame of the product storage cabinet. This technique allows improving work efficiency and avoiding misplacement of products (see Japanese Unexamined Patent Application Publication No. 06-150119).

Typical conventional vending machines, with or without the use of the cartridge, have a plurality of storage compartments and dispense a product from a specific storage compartment according to selection by a customer. One compartment contains a single type of products. Vending machines generally sell a plurality of types of products, and sales of the products vary by product types. However, since the number of compartments is limited, conventional vending machines stock the same number of the products whose sales are different. Therefore, popular products sell out faster than unpopular products, decreasing sales efficiency.

To avoid sellout, it is required to transport products to vending machines in accordance with the sale of popular products, decreasing the efficiency of restocking vending machines. Conventional vending machines can increase the number of popular products to contain by stocking the same products in a plurality of storage compartments. However, they are unable to accurately adjust the number of stock products in accordance with sales data, and thus fail in efficient product stocking or effective product selling.

The present invention has been accomplished to solve the above problems and an object of the present invention is thus to provide a vending machine capable of effective sale of a plurality of types of products.

DISCLOSURE OF THE INVENTION

In the following description, some components are intended to correspond to the components explained in exemplary embodiments of the invention which will be described later. However, this is only for simplifying the description and it is obvious that each component is not limited to their equivalents in the embodiments.

An aspect of this invention provides a vending machine for vending a plurality of products, including a selection unit for selecting products; a plurality of storage compartments, each of which containing a plurality of types of products selectable by the selection unit; an identification unit for identifying a type of each product to be dispensed first from the plurality of storage compartments; and a determination unit for determining a product to dispense based on a result of identification by the identification unit in response to selection by the selection unit. This configuration allows effective selling of products.

It is preferred that the plurality of storage compartments are storage compartments preselected from storage compartments of the vending machine to preferentially dispense products. This allows effectively emptying a compartment, thus contributing to the efficiency of stocking vending machines with products. It is also preferred that the vending machine previously cools and/or heats storage compartments selected from the storage compartments of the vending machine, and the storage compartments preferentially dispensing products are included in the selected storage compartments previously cooled and/or heated. This configuration allows lower power consumption of the vending machine. The vending machine may dispense products only from the storage compartments preferentially dispensing products.

The determination unit preferably determines a product to dispense based on a result of identification by the identification unit and a predetermined product dispense rule in response to selection by the selection unit. This configuration allows effective selling of products, meeting needs of users.

If more than one storage compartments of the plurality of storage compartments can dispense a product selected by the selection unit, a product to be dispensed may be determined so as to maximize a variety of products to be dispensed first from the plurality of storage compartments after a selected product is dispensed (the third product dispense rule, for example). This configuration increases the possibility of selling products.

If more than one storage compartments of the plurality of storage compartments can dispense a product selected by the selection unit, a product may be dispensed from a storage compartment in which a next product to be dispensed after the selected product is not included in products to be dispensed first from any other of the plurality of storage compartments (the third product dispense rule, for example). This configuration increases the possibility of selling products.

If more than one storage compartments of the plurality of storage compartments can dispense a product selected by the selection unit, a product to be dispensed may be determined based on past sales data and a product to be dispensed after the selected product (the fourth product dispense rule, for example). This configuration allows effective selling of products based on past sales data If more than one storage compartments of the plurality of storage compartments can dispense a product selected by the selection unit, the selected product may be dispensed from a storage compartment in which sales of a next product to be dispensed after the selected product are the same as or greater than sales of a next product to be dispensed after the selected product in any other storage compartments which can dispense the selected product. This configuration allows effective selling of products based on past sales data.

If more than one storage compartments of the plurality of storage compartments can dispense a product selected by the selection unit, a product may be dispensed from a storage compartment containing a largest variety of products (the fifth product dispense rule, for example). This configuration contributes to increasing the possibility of selling many varieties of products.

If first products to be dispensed from the plurality of storage compartments do not include a product selected by the selection unit, the selected product may be dispensed from a given storage compartment after a first product to be dispensed is dispensed from the given storage compartment (the sixth product dispense rule, for example). This configuration allows a user to purchase a selected product when first products to be dispensed do not include the selected product. The first product to be dispensed from the given storage compartment may be dispensed into a product delivery port. Alternatively, the first product to be dispensed from the given storage compartment may be collected within the vending machine.

Each of the plurality of storage compartments is preferably a container removable from the vending machine. This improves the efficiency of product stocking. The removable container may contain products arranged according to a predetermined product arrangement pattern, and the identification unit may identify a type of each next product to be dispensed based on a product arrangement pattern applied to the removable container. If more than one storage compartments of the plurality of storage compartments can dispense a product selected by the selection unit, a product may be dispensed from a storage compartment which has been installed first.

Another aspect of this invention provides a vending machine for vending a plurality of products, including a selection unit for selecting products; a storage compartment for containing a plurality of types of products selectable by the selection unit; an identification unit for identifying a type of a product to be dispensed first from the storage compartments; and a determination unit for determining a product to dispense based on a result of identification by the identification unit in response to selection by the selection unit. This configuration allows effective selling of products.

The storage compartment may contain products arranged in a predetermined order, and the identification unit may identify a type of the first product to be dispensed by identifying the storage compartment containing a plurality of types of products. Alternatively, the identification unit may identify a type of the first product to be dispensed based on an identifier placed on the first product to be dispensed.

Another aspect of this invention provides a system including a vending machine and a stock product determination system connected to the vending machine via network. The vending machine includes a transmission unit for transmitting sales data of products at the vending machine to the network. The stock product determination system includes memory for storing data on products which can be stocked in a storage compartment of the vending machine, memory for storing data on sales data transmitted via the network, memory for storing a stock rule for stocking products in the storage compartment, and a determination unit for determining a plurality of types of products to be stocked in the storage compartment based on the data on sales data, the data on products which can be stocked in the storage compartment, and the stock rule. This configuration allows effective selling of products.

Another aspect of this invention provides a method for determining a product to dispense in a vending machine having a plurality of storage compartments. The method includes steps of selecting a product, identifying a type of each product to be dispensed first from the plurality of storage compartments, each of the plurality of storage compartments containing a plurality of types of products selectable in the selecting step, and determining a product to dispense based on a result of identification in the identifying step in response to selection in the selecting step.

Another aspect of this invention provides a method for determining products to stock in a storage compartment of a vending machine in a stock product determination system for determining stock products in a vending machine capable of containing a plurality of types of products. The method includes steps of obtaining data on products which can be stocked in the storage compartment, obtaining data on past sales of products to be stocked in the storage compartment, and determining a plurality of types of products to be stocked in the storage compartment based on the data on past sales and the data on products which can be stocked in the storage compartment. This configuration allows product stocking that contributes to effective selling of products. It is preferred that this method further includes a step of obtaining a stock rule for stocking products in the storage compartment, and a plurality of types of products to be stocked in the storage compartment are determined based on the data on past sales, the data on products which can be stocked in the storage compartment, and the stock rule. This configuration allows effectively selling products, meeting needs of users.

Another aspect of this invention provides a system for determining products to stock in a storage compartment of a vending machine capable of containing a plurality of types of products. The system includes an obtaining unit for obtaining data on products which can be stocked in the storage compartment, an obtaining unit for obtaining data on past sales of products to be stocked in the storage compartment, and a determining unit for determining a plurality of types of products to be stocked in the storage compartment based on the data on past sales and the data on products which can be stocked in the storage compartment. This configuration allows product stocking that contributes to effective selling of products.

Another aspect of this invention provides a cartridge for containing a plurality of types of products and being installed in a vending machine. The cartridge contains a plurality of rows of arranged products. Each row of the plurality of rows has a plurality of products. A (N+1)th row has a product not included in a Nth row (N is a whole number greater than 0) of the plurality of rows. In front of the product not included in the Nth row is placed a product most likely to be selected in the Nth row. This configuration increases the possibility of selling products.

Another aspect of this invention provides a method for determining stock products in a stock product determination system for determining stock products in a vending machine capable of containing a plurality of types of products. The vending machine has a plurality of rows of products, and each row of the plurality of rows has a plurality of products.

The method includes steps of (a) determining the number of a first type of products in a Nth row (N is a whole number greater than 0), (b) obtaining the number of products in a (N+M)th row (M is a whole number greater than 0), and (c) determining the number of a first type of products in the (N+M)th row based on the number of the first type of products in the Nth row, the number of products in the (N+M)th row, and a ratio of the number of the first type of stock products with respect to other types of stock products. This configuration allows product stocking in a vending machine that achieves the effective selling of products.

In the above method, the M may be 1, and the step (c) may determine the number of a first type of products in the (N+1)th row so that a total number of the first type of products contained in the (N+1)th and Nth rows approaches the ratio of the number of stock products.

Another aspect of this invention provides a system for determining stock products in a vending machine. The vending machine has a plurality of rows of products, and each row of the plurality of rows has a plurality of products. The system includes a determining unit for determining the number of a first type of products in a Nth row (N is a whole number greater than 0), an obtaining unit for obtaining the number of products in a (N+M)th row (M is a whole number greater than 0); and a determining unit for determining the number of a first type of products in the (N+M)th row based on the number of the first type of products in the Nth row, the number of products in the (N+M)th row, and a ratio of the number of the first type of stock products with respect to other types of stock products. This configuration allows product stocking in a vending machine that achieves the effective selling of products.

BRIEF DESCRIPTION OF THE DRAWINGS

FIG. 7 is a view to explain a product dispense rule according to an embodiment of the present invention.

FIG. 8 is a view to explain a product dispense rule according to an embodiment of the present invention.

FIG. 9 is a view to explain a product dispense rule according to an embodiment of the present invention.

FIG. 10 is a view to explain a product dispense rule according to an embodiment of the present invention.

FIG. 14 is a view to explain a stock product determination method according to an embodiment of the present invention.

FIG. 15 is another view to explain a stock product determination method according to an embodiment of the present invention.

BEST MODES FOR CARRYING OUT THE INVENTION

Figure 1:
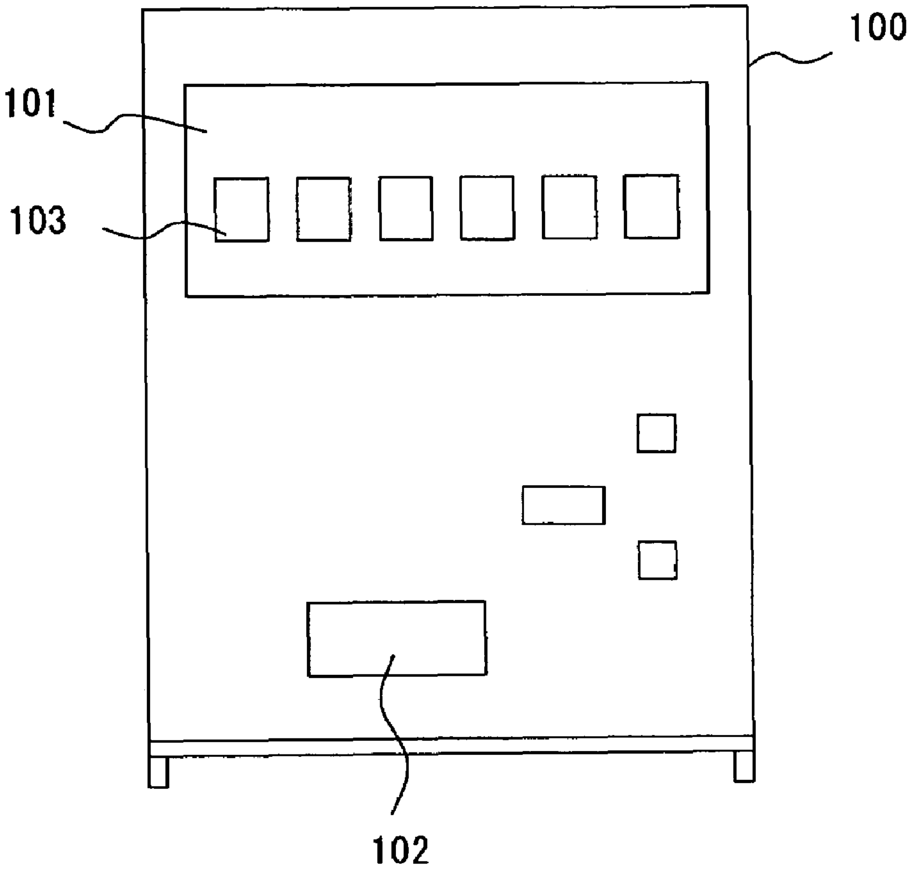
FIG. 1 is a front elevational view of a vending machine according to an embodiment of the present invention.

A vending machine in this embodiment of the present invention has a plurality of storage compartments for containing products. Some of the compartments contain a plurality of types of products. In response to selection by a customer, the machine determines a product to be dispensed from the compartment based on a given rule or data. Though the following description will explain several embodiments of the present invention, the present invention is not limited thereto. A certain amount of omission and simplification will be made to clarify the description. It will be obvious to those skilled in the art that various changes and modifications may be made without departing from the scope of the invention FIG. 1 is a front elevational view showing an example of a vending machine to which the present invention may be applied. In FIG. 1, reference numeral 100 denotes a vending machine, 101 a product display area for displaying products, 102 a product delivery port for access by a customer to a product, and 103 product selection parts such as push-buttons for purchase product selection by a customer. When a customer inserts a coin and selects a product at the product selection parts 103, the selected product is dispensed into the product delivery port. The product display area 101 may be a window to display product samples, or a display device such as a flat display, for example. The vending machine to which the present invention is applicable may vend a variety of products including beverages, foods, and toys.

If the product display area 102 is a display device, the product display area 101 can display new product information, commercial messages, recommended products, campaign information and so on, in addition to products on sale. It is also possible to display information on a selected product in response to selection. It is further possible to display a map, local information, local shopping street information, local bus service information and other information of the area where the vending machine is installed. The vending machine 100 is connected to a center via network, and the display device displays necessary information according to instructions from the center.

The product display area 101 may be a touch-screen. The display area 101 displays product images and a customer can select a product by touching one of the product images which are the product selection parts 103. The product images to be displayed and the way to display product images are determined by associating the product images displayed on the display area 101 with the stock products contained in the vending machine 100. For example, the product display area 101 can undisplay sold-out product images or display new product images larger than other product images.

Figure 2:
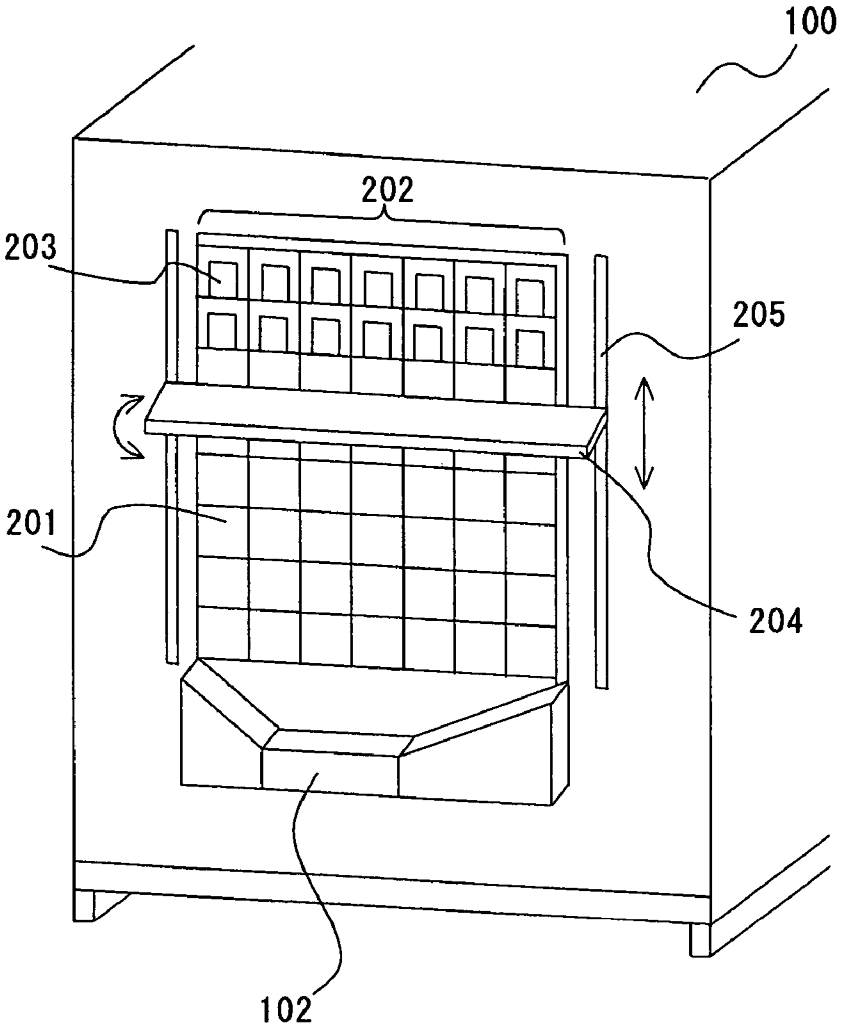
FIG. 2 is a view to schematically explain the internal structure of a vending machine according to an embodiment of the present invention.
Figure 2:
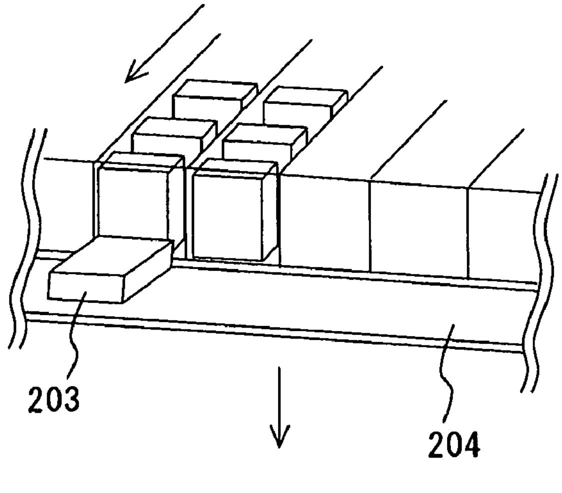

FIG. 2 shows the overall internal structure of the vending machine 100. In FIG. 2, reference numeral 201 denotes a product storage compartment for containing products, 202 denotes a product storage area comprising a plurality of product storage compartments 201, and 203 denotes a product contained in each of the product storage compartments 201. Reference numeral 204 denotes a delivery rack for delivering products dispensed from the storage compartments 201 to the product delivery port 102. The delivery rack can move up and down and rotate around an axis. Reference numeral 205 denotes a delivery mechanism for moving the delivery rack 204. The product storage area 202 illustrated in FIG. 2 has 56 compartments with 8 rows and 7 columns.

When a coin is inserted and a product is selected at the product selection parts 103, the delivery mechanism 205 moves the delivery rack 204 to the row including the storage compartment 201 which can dispense the selected product. The selected product is dispensed from the storage compartment 201 onto the delivery rack 204, and the delivery rack 204 moves down toward the product delivery port 102. The delivery rack 204 then stops at a given position and drops by rotation the product into the product delivery port 102.

Figure 3:
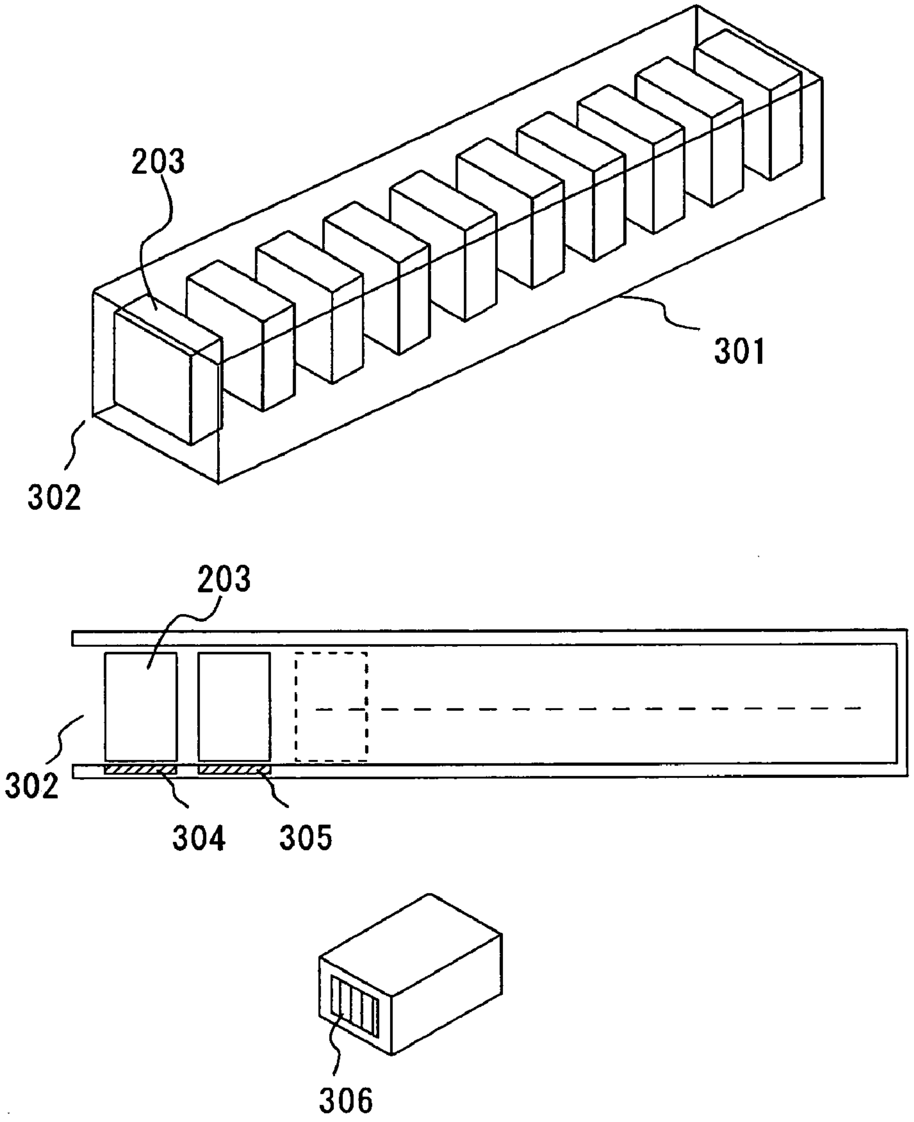
FIG. 3 is a view to explain the structure of a cartridge that is a replaceable compartment according to an embodiment of the present invention.

FIG. 3 shows the structure of the product storage compartment 101 in this embodiment. It is preferred to use a cartridge 301 which is a container replaceable from the vending machine 100 as the storage compartment in this embodiment. The vending machine can use a fixed storage compartment for the storage of a plurality of types of products. The use of the replaceable cartridge as the storage compartment allows simplification of product restocking and improvement of work efficiency. Further, it eliminates the need for a product storage container such as a paperboard box used for product restocking, thereby reducing wastes. The cartridge 301 can contain a plurality of the products 203. The cartridge illustrated in FIG. 3 contains a row of products and dispenses a product at the front of the row from a front opening 302. After the product at the front is dispensed, the next product moves toward the front opening 102. An alternative cartridge may contain two or more rows of products and dispense the products at the front of each row simultaneously or selectively.

The cartridges 301 are packed with products in a factory and so on and transported to a vending machine by truck and the like. Old cartridges are removed from the vending machine and new cartridges are installed in the machine. The cartridges 301 in this embodiment can contain a plurality of types of products selectable at the product selection parts 103. For example, one cartridge may contain products A, B, and C, and another cartridge may contain products A and D. Some cartridges may contain a single type of products. A plurality of types of products may be placed in the cartridge in a random or given order.

The cartridge 301 has detectors 304 and 305 for detecting a product type at near the front opening. Barcode readers or RF tag readers may be used as the detectors, for example. The detectors read an identifier 306 such as a barcode or RF tag placed on the bottom of the product 203 to detect the product type. The detector 304 detects the type of the first product to be dispensed from a compartment in advance or in response to product selection at the product selection parts 103. The detector 305 detects the type of the second product to be dispensed from the compartment. The cartridge 301 may have more detectors.

The present invention is also applicable to other types of vending machines. For example, another typical vending machine has a plurality of vertical product storage compartments placed perpendicularly in the machine. Products are placed into the storage compartments through an opening at the top of each compartment and dispensed through an opening at the bottom of each compartment. It is also possible to use a delivery arm, instead of the delivery rack used in this embodiment, to retrieve a product from a storage compartment.

A cartridge may have a barcode, RF tag, or other mechanically detectable identifiers. The vending machine 100 identifies a cartridge by reading the identifier of each cartridge. If the type, number, or arrangement of products contained in a cartridge is predetermined, a product to be dispensed from the cartridge may be identified by identifying the cartridge instead of or in addition to using the detectors 304 and 305. When stocking a cartridge, products may be placed into the cartridge in accordance with an arrangement pattern which is selected from a plurality of predetermined arrangement patterns.

Figure 4:
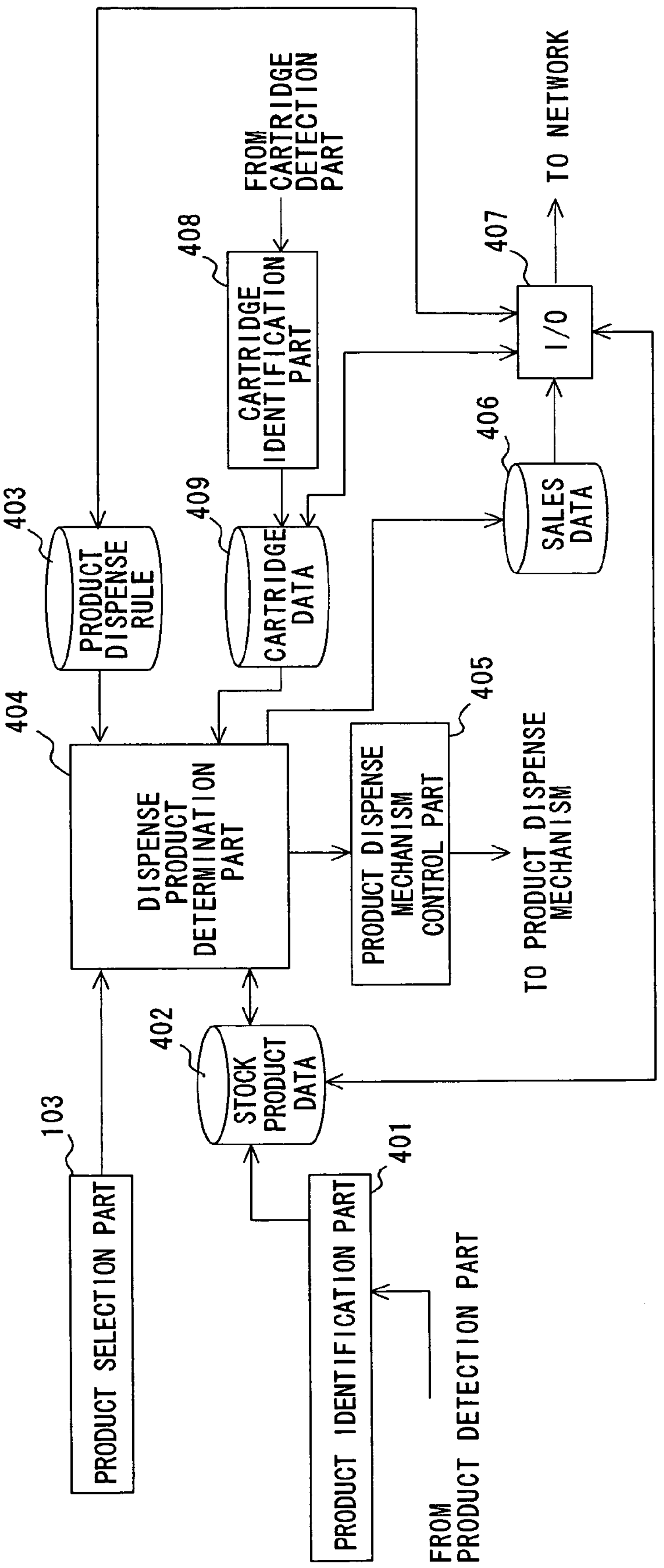
FIG. 4 is a view to explain a logical configuration for determining a product to be dispensed in a vending machine according to an embodiment of the present invention.

Each of the product storage compartments 201 can contain a plurality of types of products. Thus, in selling a product selected by a customer, the vending machine 100 in this embodiment determines a compartment to dispense the selected product. FIG. 4 shows the logical configuration of the vending machine 100 in this embodiment for determining a product to dispense. Those skilled in the art will be able to implement the logical configuration in this embodiment by hardware or activating software on hardware including a processor.

Reference numeral 401 denotes a product identification part for identifying the products contained in each compartment based on detection signals from a product detection part such as a barcode reader. Reference numeral 402 denotes a memory area for storing stock product data from the product identification part 401. The stock product data includes data on the products contained in each storage compartment. The stock product data, for example, includes information such as a compartment number, the type of the product which is the first to be dispensed from the compartment, the type of the product which is the second to be dispensed from the compartment, the number of types of products contained in the compartment, the number of remaining products in the compartment, and whether the compartment is included in a priority area. Those information is stored in association with each other.

Reference numeral 403 denotes a memory area for storing a product dispense rule which is applied to product dispensing. The product dispense rules will be detailed later. Reference numeral 404 denotes a dispense product determination part for determining a product to be dispensed, or, in other words, a compartment to dispense a product based on the stock product data and the product dispense rule. Each memory area stores data transmitted from a center via network. Denoted by reference numeral 405 is a product dispense mechanism control part for controlling the delivery rack 204 and the delivery mechanism 205 to move the rack. Denoted by reference numeral 406 is a memory area for storing sales data from the dispense product determination part 404. The sales data may include information such as total sales of a vending machine, total sales of each product, sales of each cartridge, time when each product is sold, total stocks, and the number of remaining products in each cartridge, for example.

Reference numeral 407 denotes an I/O interface for connecting the vending machine 100 and the network. Reference numeral 408 denotes a cartridge identification part for identifying the cartridges to be installed is in the vending machine based on detection signals from a cartridge detection part. Denoted by reference numeral 409 is a memory area for storing cartridge data from the cartridge identification part. The cartridge data is information on the cartridges installed in the vending machine. The cartridge data may include, for example, information such as the types of cartridges and the position, order, time and day in which cartridges are installed in the vending machine, which are associated with each other. The cartridge detection part detects the presence or absence of cartridges or, if the cartridges have identifiers, detects the identifiers upon installation or replacement of cartridges. The cartridge identification part 408 identifies the above information on cartridges based on detection signals from the cartridge detection part and has the information stored in the memory.

Each storage compartment of the vending machine in this embodiment can contain a plurality of types of products. Thus, the case may occur that a plurality of compartments can dispense a selected product or that none of the first-to-be-dispensed products in any compartments is a selected product. In the vending machine in this embodiment, once a product is selected at the product selection part 103, the dispense product determination part 404 determines a product to be dispensed or a compartment to dispense a product based on selected product data from the product selection part 103, data on the products contained in each storage compartment, and a product dispense rule.

Figure 5:
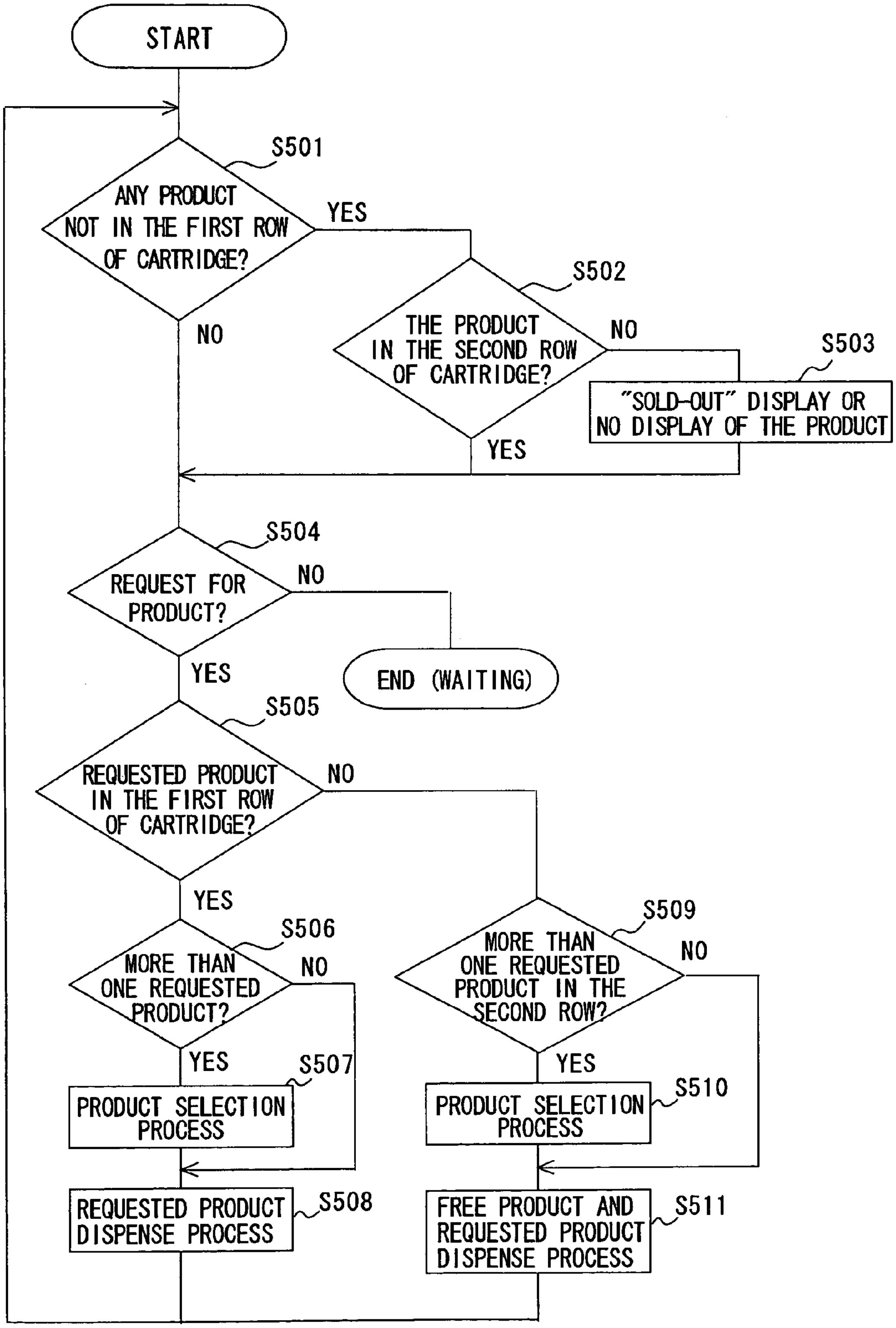
FIG. 5 is a flowchart to explain the operation of a vending machine according to an embodiment of the present invention.

Referring now to FIG. 5, a flowchart depicting an example of the basic operation of the vending machine 100 in this embodiment is shown. Steps S501 to S503 in FIG. 5 explain the operation regarding product display on the product display area 101. Making reference to FIG. 5, the vending machine 100 determines if there is a product that is not included in the products at the front row of the cartridges which can dispense products, or, in the other words, that is not included in the products which are the first to be dispensed from the cartridges. If a specific product is not included, the machine determines if the products in the second row or the products which are the second to be dispensed from the cartridges include the specific product. If the products in the second row do not include the specific product, the product display area 101 undisplays the product or displays "sold out" message.

The steps after S504 in FIG. 5 relate to a process of determination regarding product dispensing in response to product selection. Referring again to FIG. 5, once a product is selected at the product selection part 103 (S504), a determination is made regarding whether the requested product exists at the front row of the cartridges capable of dispensing products (S505). If the selected product is at the front row of any cartridge, another determination is made regarding whether a plurality of the selected products exist (S506).

If the selected product is included at the front row of a plurality of cartridges, or, if the selected product matches a plurality of products placed at the front row of one cartridge when one cartridge has a plurality of products in the first row, a product selection process is performed (S507). The product selection process will be described in greater detail later. After a product to be dispensed is determined by the product selection process at S507, the product is dispensed (S508).

If, on the other contrary, the selected product is not included at the front row of any cartridges, a determination is made regarding whether the products at the second row of the cartridges, or, in other words, the products to be dispensed in the second place include a plurality of the selected products (S509). If a plurality of the selected products are included therein, the product selection process is performed to determine a product to be dispensed or a cartridge to dispense a product (S510). The product selection process will be detailed later on. Then, the selected product and an extra product as a free gift are dispensed (S511). If, on the other hand, a single selected product is included therein, that product and an extra product are dispensed (S511).

In the following, the product dispense rules applicable to the vending machine in this embodiment will be explained. The product dispense rules may be used independently or in combination. It is also possible to change the priority of each rule when necessary and use the rules in combination.

The first product dispense rule which may be applied to the vending machine in this embodiment will be explained hereinafter. According to this rule, if a plurality of cartridges can dispense a selected product, the selected product is dispensed from the oldest-installed cartridge. This rule allows effectively emptying each cartridge, thus enabling effective product restocking. The dispense product determination part 404 initially obtains the product dispense rule. Once a product is selected at the product selection part 103, selected product data is provided to the dispense product determination part 404. The dispense product determination part 404 specifies the oldest cartridge which was the first to be installed in the vending machine.

The dispense product determination part 404 retrieves stock product data 402 from the memory and determines whether the first-to-be-dispensed product in the first-installed cartridge matches the selected product. If they match, the determination part determines that the selected product is dispensed from the first cartridge and issues a command to the product dispense mechanism control part 405 to have a product dispensed from the first cartridge. Based on the command, the product dispense mechanism control part 405 sends control signals to a product dispense mechanism. If, on the other hand, the first-to-be-dispensed product in the first storage compartment and the selected product do not match, the determination part compares the first-to-be-dispensed product in the second-oldest-installed cartridge with the selected product and determines whether they match. In this way, the dispense product determination part 404 continues to compare the first-to-be-dispensed products in the cartridges with the selected product in order of cartridge installation until it finds the oldest cartridge in which the first-to-be-dispensed product matches the selected product.

Alternatively, a rule that gives the cartridge containing the fewest products a priority to dispense a product may be applied. This rule allows generating more empty cartridges, thus contributing to more effective product restocking by cartridge replacement.

Figure 6:
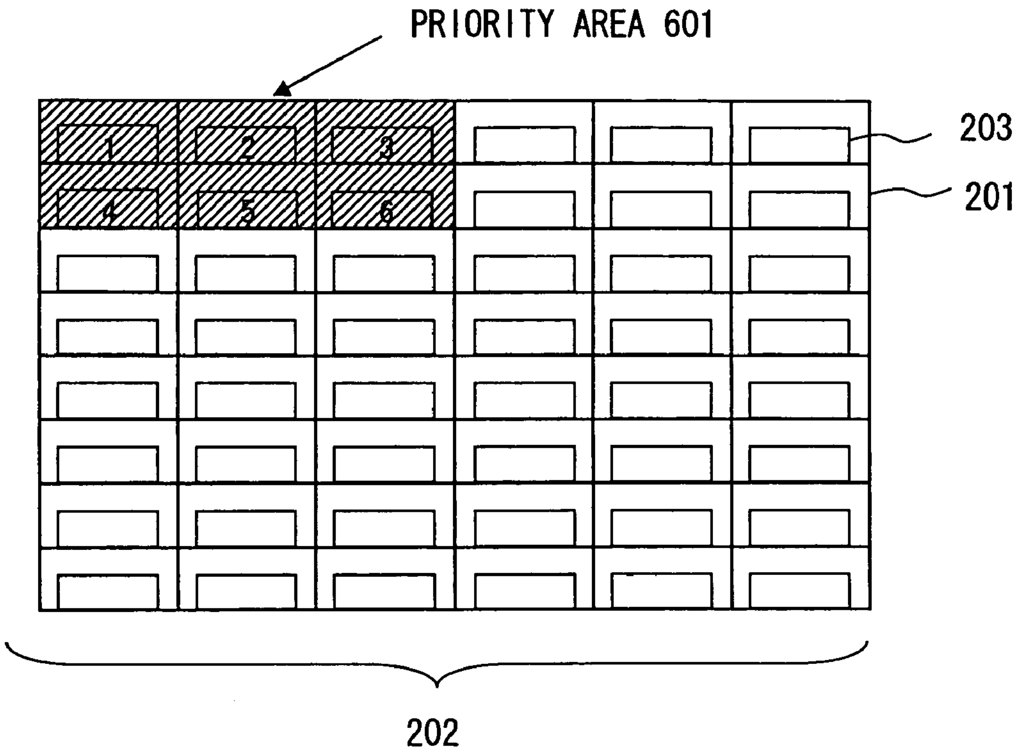
FIG. 6 is a view to explain compartments having a priority on dispensing products in a product storage area of a vending machine according to an embodiment of the present invention.

The second product dispense rule gives a storage compartment or compartments 201 in the product storage area 202 a priority over the other storage compartments to dispense a product. Referring now to FIG. 6, a product is dispensed by priority from six storage compartments 201 (compartment 1 to 6) included in a priority area 601 of the product storage area 202. This rule allows effectively emptying a specific cartridge or cartridges.

The operation based on this rule will be explained hereinbelow in detail. Once a product is selected at the product selection part 103, the dispense product determination part 404 obtains selected product data to identify a selected product. The dispense product determination part 404 also retrieves data to identify the cartridges included in the priority area form the cartridge data. The determination part 404 further retrieves from the memory the stock product data on the storage compartments 201 included in the priority area 601. If the first-to-be-dispensed products in the storage compartments within the priority area 601 and the selected product match, the dispense product determination part 404 determines to dispense the matched product. If they do not match, on the other hand, the selected product can be dispensed from the storage compartments in the other area.

The vending machine 100 may cool or heat only the products contained in the storage compartments 203 within the priority area 601. Cooling or heating only in the limited priority area 601 allows lower power consumption. In the case of cooling or heating the priority area 601 only, it is typical that a selected product is dispensed only from this area, not from the other storage compartments.

The third rule is applied to the case where a plurality of compartments can dispense a selected product. For clarification of an explanation, the case where a product is dispensed from the priority area 601 will be described. This rule is not necessarily used in combination with the rule of the priority area. Referring now to FIG. 7, products contained in the storage compartments within the priority area are shown. In FIG. 7, reference numeral 701 designates an identification number of each storage compartment. Each column corresponds to a storage compartment, and products are sequentially dispensed from the compartment from the bottom of each column. Hereinafter, the product which is the first to be dispensed from each compartment will be referred to as the first-to-be-dispensed product 702, and the product which is the second to be dispensed from the compartment will be referred to as the second-to-be-dispensed product 703. A reference symbol for each product indicates a product type, and the products with the same symbol are the products of the same type. For example, the first-to-be-dispensed product in the storage compartment 1 in FIG. 7 is a product type A, and the second-to-be-dispensed product is also a product type A. The first-to-be-dispensed product in the storage compartment 4 is a product type B, and the second-to-be-dispensed product is a product type D.

According to this rule, if a plurality of storage compartments can dispense a selected product, a storage compartment to dispense a product is determined based on the second-to-be-dispensed product in each storage compartment. This rule determines a storage compartment to dispense a product so as to maximize a variety of the first-to-be-dispensed products in the storage compartments within the priority area after the selected product is dispensed. This increases the possibility of selling products. FIG. 7 shows the case where a product B is selected. The first-to-be-dispensed products in the compartments 4 and 5 are both products B. The second-to-be-dispensed product in the compartment 4 is a product D. The second-to-be-dispensed product in the compartment 5 is a product C. The product D is not included in the first products to be dispensed from the other compartments. The product C is the first product to be dispensed from the compartment 6. Therefore, dispensing the product B from the compartment 4 maximizes a variety of the first-to-be-dispensed products in the compartment 1 to 6.

The operation of the vending machine to which this rule is applied will be explained hereinbelow in detail. Once a product is selected at the product selection part 103, the dispense product determination part 404 obtains selected product data from the product selection part 103. The dispense product determination part 404 then retrieves data to identify the storage compartments included in the priority area from the cartridge data 409. The determination part 404 further retrieves stock product data regarding the products contained in the storage compartments within the priority area from the stock product data 402. Based on the retrieved stock product data, the dispense product determination part 404 sequentially compares the selected product data with data on the first-to-be-dispensed product in each compartment. As a result, it is determined that the first products to be dispensed from the storage compartments 4 and 5 match the selected product. Further, after checking the second-to-be-dispensed products in the storage compartments 4 and 5, and the first-to-be-dispensed products of the other storage compartments, the dispense product determination part 404 selects the storage compartments 4 so as to maximize a variety of the products which are the first to be dispensed.

The fourth rule is applied to the case where a plurality of storage compartments can dispense a selected product. An explanation will be given on the case where a product is dispensed from the priority area 601 to clarify the description. This rule is not necessarily used in combination with the rule of the priority area. Referring now to FIG. 8, products contained in the storage compartments within the priority area are shown. The format of FIG. 8 is the same as that of FIG. 7.

According to this rule, if a plurality of storage compartments can dispense a selected product, a storage compartment to dispense a product is determined based on the second-to-be-dispensed product in each compartment and past sales data. More specifically, a selected product is dispensed from the storage compartment in which sales of the second product to be dispensed are greater than sales of the second products in any other compartments. FIG. 8 shows the case where a product B is selected. The first-to-be-dispensed products in the storage compartments 4 and 5 are both products B. The second-to-be-dispensed product in the storage compartment 4 is a product D. The second-to-be-dispensed product in the storage compartment 5 is a product E. According to past sales data, the sales of the product D are greater than the sales of the product E. Therefore, having the product B dispensed from the storage compartment 4 allows the product with high sales potential to be the next product to be dispensed from the storage compartment, thereby creating more effective selling of products.

The operation of the vending machine to which this rule is applied will be explained hereinafter in detail. Once a product is selected at the product selection part 103, the dispense product determination part 404 obtains selected product data from the product selection part 103. The determination part 404 then retrieves data to identify the storage compartments included in the priority area from the cartridge data 409. The determination part 404 further retrieves stock product data regarding the products contained in the storage compartments within the priority area from the stock product data 402.

Based on the retrieved stock product data, the determination part 404 compares the selected product data with the data on the first-to-be-dispensed product of each storage compartment. As a result, it is determined that the first products to be dispensed from the compartments 4 and 5 match the selected product. The dispense product determination part 404 then retrieves from the sales data 406 the sales data of the product D and the product E which are the products second to be dispensed from the compartments 4 and 5, respectively. The determination part then compares the sales data of the products D and E and determines to have the product B dispensed from the compartment 4 which contains the product D having greater past sales.

Another rule to determine a storage compartment to dispense a product based on past sales may be such that a storage compartment to dispense a product is determined so that the ratio of the number of the first-to-be-dispensed products in the cartridges after dispensing a selected product is close to the ratio of past sales. For example, referring back to FIG. 7, if the sales of the product D are significantly smaller than the sales of the product C, the product B may be dispensed from the storage compartment 5.

The fifth rule is applied to the case where a plurality of storage compartments can dispense a selected product. An explanation will be given on the case where a product is dispensed from the priority area 601 to clarify the description. This rule is not necessarily used in combination with the rule of the priority area. Referring now to FIG. 9, products contained in the storage compartments within the priority area are shown. The format of FIG. 9 is the same as that of FIG. 7.

According to this rule, if a plurality of storage compartments can dispense a selected product, a storage compartment to dispense a product is determined based on a variety of products contained in each storage compartment. More specifically, a selected product is dispensed from the storage compartment which contains more varieties of products than the other compartments. FIG. 9 shows the case where a product B is selected. The first-to-be-dispensed products in the storage compartments 4 and 5 are both products B. The storage compartment 4 contains three types of products: A, B, and C. The storage compartment 5 contains four types of products: B, C, D, and E. Accordingly, the storage compartment 5 has more varieties of products than the storage compartment 4 does. Therefore, dispensing the product B from the storage compartment 5 increases the possibility of selling more varieties of products, thereby reducing sold-out products.

The operation of the vending machine to which this rule is applied will be explained hereinafter in detail. Once a product is selected at the product selection part 103, the dispense product determination part 404 obtains selected product data from the product selection part 103. The dispense product determination part 404 then retrieves data to identify the storage compartments included in the priority area from the cartridge data 409. The dispense product determination part 404 further retrieves stock product data regarding the products contained in the storage compartments within the priority area from the stock product data 402. Based on the stock product data retrieved, the dispense product determination part 404 compares the selected product with the first-to-be-dispensed product of each compartment. As a result, it is determined that the first-to-be-dispensed products of the storage compartments 4 and 5 match the selected product. The dispense product determination part 404 then determines the number of types of products in each of the storage compartments 4 and 5 based on the stock product data on those two compartments. The determination part thereby determines to have the product B dispensed from the storage compartment 5 having more varieties of products.

The sixth rule is applied to the case where none of the first-to-be-dispensed products in any compartments matches a selected product. An explanation will be given on the case where a product is dispensed from the priority area 601 to clarify the explanation. This rule is not necessarily used in combination with the rule of the priority area. Referring now to FIG. 10, products contained in the storage compartments within the priority area are shown. The format of FIG. 10 is the same as that of FIG. 7.

According to this rule, if none of the first-to-be-dispensed products in any compartments within the priority area matches a selected product, the selected product is dispensed from the storage compartment whose second-to-be-dispensed product matches the selected product. The storage compartment to dispense the selected product also dispenses the first-to-be-dispensed product. The first product to be dispensed may be delivered to the product delivery port 102 as a free gift for a customer or delivered to a collection area placed within the vending machine. The number of extra products or the number of products to be dispensed before dispensing a selected product is optional to set.

If none of the second-to-be-dispensed products in any storage compartments within the priority area matches the selected product, the product display area undisplays the image of the product or displays "sold out" message as explained above. If, on the other hand, the second-to-be-dispensed products of a plurality of compartments match the selected product, a compartment to dispense the product is determined according to the above rules. It is also possible to apply another rule such as dispensing a selected product from a compartment containing a new product as the first product to be dispensed.

The operation of the vending machine to which this rule is applied will be explained hereinbelow in detail. Once a product is selected at the product selection part 103, the dispense product determination part 404 obtains selected product data from the product selection part 103. Referring again to FIG. 10, a product D is selected, for example. The dispense product determination part 404 then retrieves data to identify the storage compartments included in the priority area from the cartridge data 409. The determination part 404 further retrieves stock product data regarding the products contained in the storage compartments within the priority area from the stock product data 402. Based on the stock product data retrieved, the dispense product determination part 404 compares the selected product with the first-to-be-dispensed product in each storage compartment. As a result, a determination is made that none of the first products to be dispensed from any compartments matches the selected product.

The dispense product determination part 404 then compares the selected product with the second-to-be-dispensed product in each storage compartment and determines that the second-to-be-dispensed products in the storage compartments 3 and 4 match the selected product. Further, products to be dispensed after that (the third-to-be-dispensed products) are identified from the product stock product data on the storage compartments 3 and 4. Then, a storage compartment to dispense the selected product is determined so as to maximize a variety of the first-to-be-dispensed products in the priority area after the selected product is dispensed, for example. The third product to be dispensed from the storage compartment 3 is a product B, and that from the storage compartment 4 is a product E. The product B is the first product to be dispensed from the storage compartment 5, and the product E is not included in the first products to be dispensed from any storage compartments other than the storage compartment 4. Therefore, the dispense product determination part 404 determines to have the products dispensed from the storage compartment 4.

Figure 11:
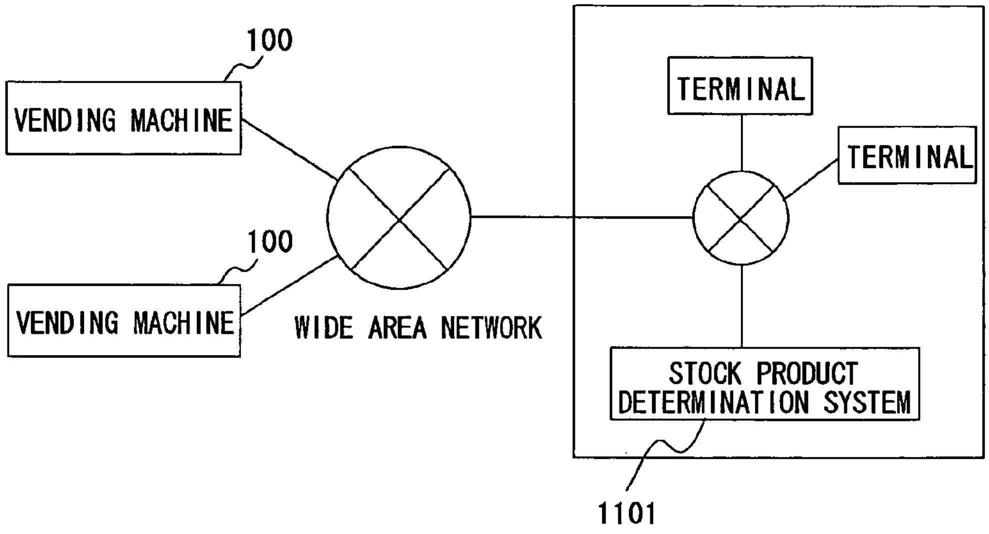
FIG. 11 is a view to explain a system configuration of an automatic selling system according to an embodiment of the present invention.
Figure 11:
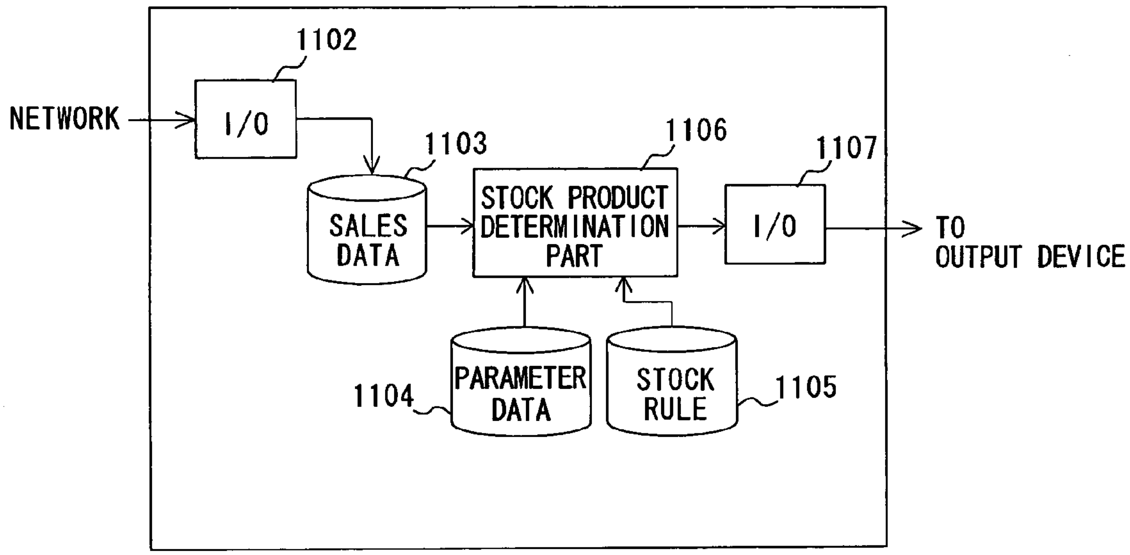

Turning now to FIG. 11*a*, it shows a network system including the vending machines 100 and a factory or center which determines products to be stocked in storage compartments such as cartridges. The vending machines 100 are connected to the network within the center via a wide area network. Also connected to the network in the center is a stock product determination system 1101 for determining products to be stocked in cartridges or storage compartments of vending machines not using cartridges based on data transmitted from vending machines. Based on determinations of the system, necessary products are transported from the center to the vending machines. In the following, an explanation will be given on the case where products are packaged into cartridges.

Connected to the network, vending machines can have various uses. For example, a vending machine can be endowed with a function of wireless router. Installing the vending machine endowed with the wireless router function in a floor of a building allows easy construction of in-floor LAN.

The vending machines can transmit their product sales data to the center in real time. Stocking products into cartridges based on the sales data achieves effective product selling.

Referring now to FIG. 11*b*, the logical configuration of the stock product determination system in the center is shown. In FIG. 11*b*, reference numeral 1102 designates an I/O interface which enables connection with the network. Reference numeral 1103 designates a memory area for storing sales data transmitted from the vending machines 100 through the network. Reference numeral 1104 designates a memory area for storing various parameters which are referred to when determining products to be stocked into the vending machines. Denoted by reference numeral 1105 is a memory area for storing a stock rule which is used when determining products to be stocked into the vending machines. Denoted by reference numeral 1106 is a stock product determination part which obtains the sales data, parameters, or a stock rule and determines products to be stocked into cartridges based on those rule and data.

Figure 13:
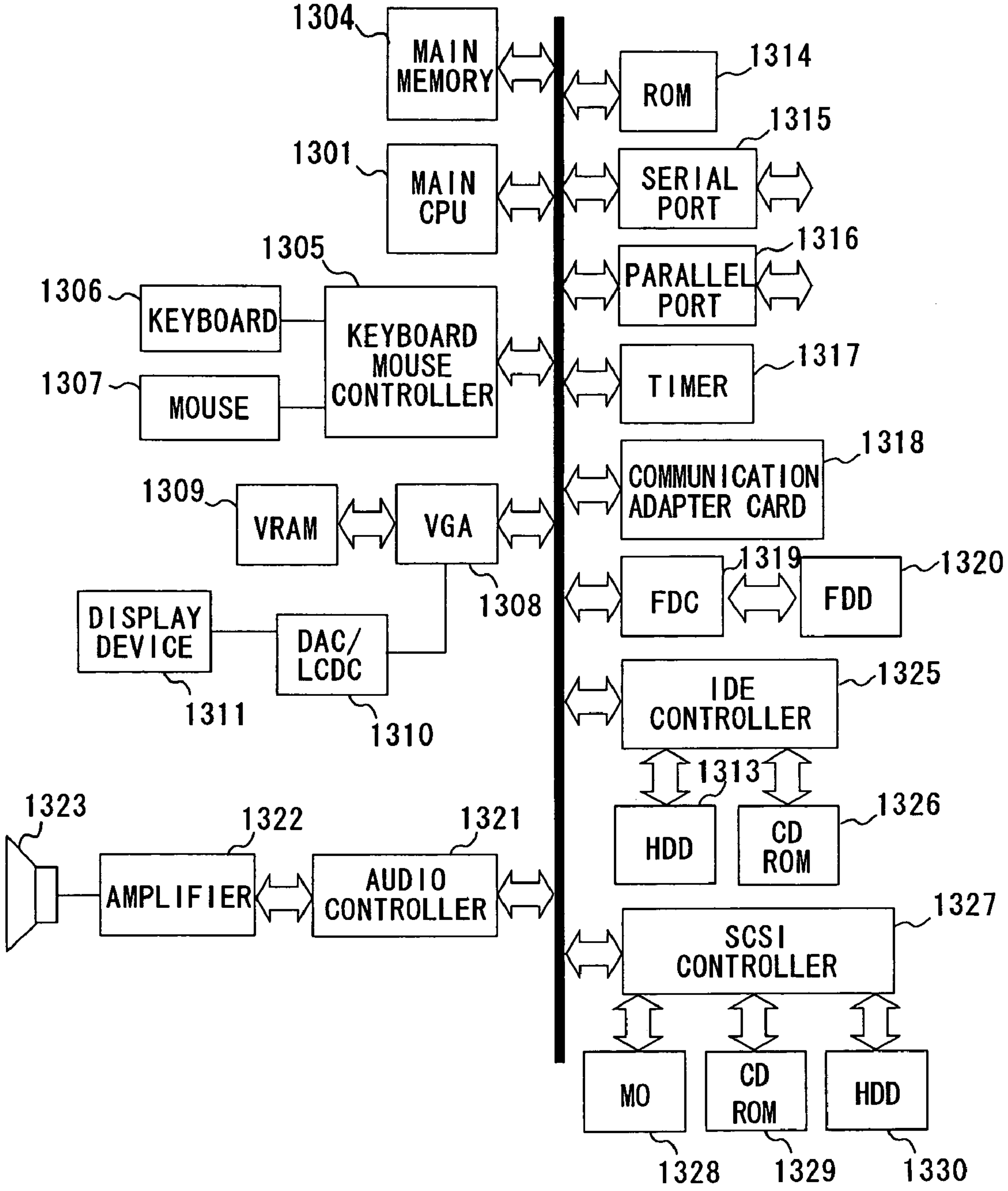
FIG. 13 is a view to explain a hardware configuration in which the stock product determination system according to an embodiment of the present invention may be implemented.

The stock product determination system 1001 may be implemented by using hardware logic or using software by installing necessary programs on hardware. FIG. 13 shows a hardware configuration capable of executing programs. FIG. 13 includes a central processing unit (CPU) 1301 and memory 1304. The CPU and memory are connected to a hard disk device 1313 as an auxiliary storage device via a bus. Storage medium drivers such as a flexible disk device 1320, the hard disk device 1313, and a CD-ROM drive 1329 are connected to the bus via controllers such as a flexible disk controller 1319, IDE controller 1325, and SCSI controller 1327.

A portable storage medium such as a flexible disk is installed in the storage medium drivers such as a flexible disk device. The storage medium may store computer program for supplying instructions to the CPU 1301 and so on in collaboration with operating system to implement this embodiment. The computer program is executed by being loaded to the memory 1304. The computer program may be stored in the storage medium by being compressed or split into several parts.

The hardware configuration may be a system further comprising user interface hardware. The user interface hardware includes, for example, a pointing device (a mouse 1307, joystick, and the like) and a keyboard 1306 for input, and a display 1311 for presentation of visual data to users. Further, a printer may be connected via a parallel port 1316. It is also possible to connect a modem via a serial port, and the connection with the network is made via the serial port, the modem or a token ring, and a communication adapter 1318 to communicate with other computer systems. These components are just for examples, and not all the components are necessary for this embodiment. This is the same for the logical configuration of dispense product determination in the vending machine in this embodiment.

Figure 12:
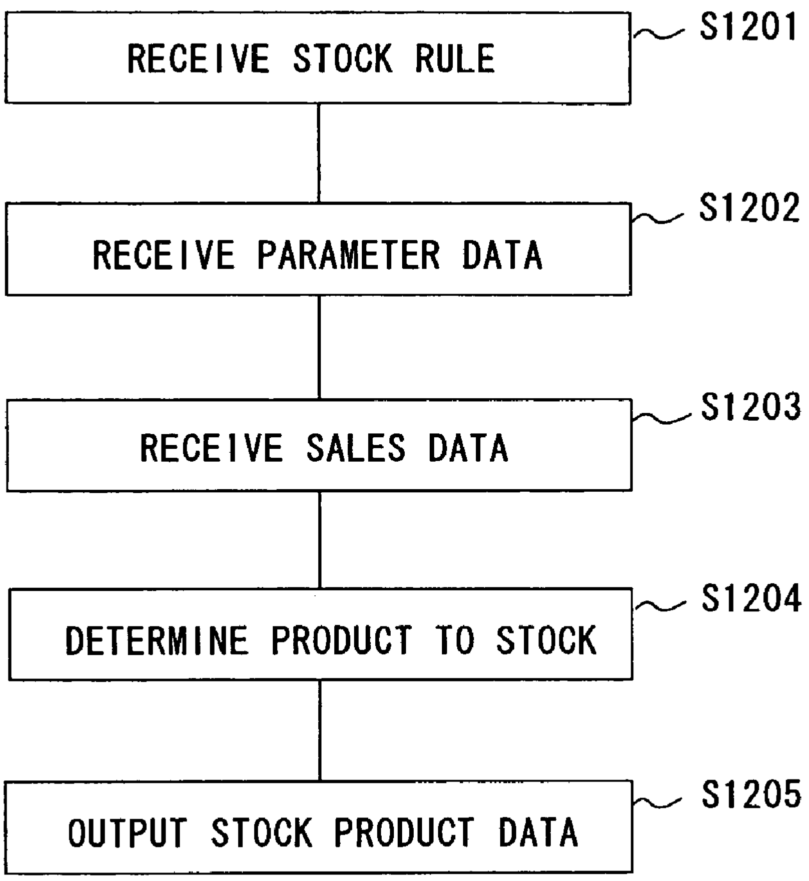
FIG. 12 is a flowchart to explain the operation of a stock product determination system according to an embodiment of the present invention.

Referring now to FIG. 12, the product determination part 1106 retrieves the product stock rules 1105 from the memory (S1201). The product determination part 1106 also retrieves the parameter data 1104 and the sales data 1103 from the memory (S1202, S1203), and then determines products to be stocked in cartridges according to the stock rules 1105 (S1204). In the determination of stock products, product types to be contained in each cartridge, the number of each product type, or arrangement of products in cartridges may be determined. The product determination part 1106 may determine stock products according to a single or combination of stock rules. The data determined is input to an output device such as a display device, or input to other devices via network (S1205).

The sales data 1103 is stored in association with local area information, season and time information, and so on. The sales data may include sales data of each vending machine, sales data of whole or part of an area, and data on product sales according to season and time. The parameter data used for determination of stock products may include cartridge information such the storage capacity of a cartridge, the product dispense capacity of a cartridge, the number of cartridges in the priority area, the number of cartridges in the vending machine, and so on.

Additionally, the parameter data 1104 may include marketing information such as information on product types storable in each cartridge, information on seasonal products and new products, and so on. The product dispense capacity of a cartridge is the number of products which can be dispensed from a storage compartment in response to product selection. If a cartridge can dispense products not only in the front row but also in the second row, the product dispense capacity is two. If a plurality of products can be placed in the front row, it is the number of those products.

When placing products into cartridges, the types of products and the number of each product type to be stocked in each cartridge are determined, and then the products determined thereby are placed into cartridges at random. Alternatively, the products determined may be placed into each cartridge according to a predetermined arrangement rule.

A product stock rule for placing products into cartridges determines the number of stock products so that it is substantially proportional to the number of past sales. The number of products to be stocked in each cartridge is determined according to the storage capacity of a vending machine and the storage capacity of each cartridge. In order to follow the stock rule, it is possible to change stock products from cartridge to cartridge such as placing products with small sales into some cartridges only.

The process of determining products to be stocked into a cartridge in the case where a cartridge can contain 25 products, for example, will be explained hereinafter with reference to FIG. 14. FIG. 14 shows products contained in a cartridge. The arrangement of the products in each row is not according to a specific rule. The product determination part 1106 performs the following stock product determination process by obtaining necessary product stock rules, parameter data, and sales data. The cartridge contains five rows of products, each row having five products, as shown in FIG. 14. In the explanation of this example, the foremost row having five products which are the first to be dispensed is referred to as the first row, followed by the second and third rows, and the rearmost row is the fifth row.

In this example, three types of products A, B, and C as the first, second and third type of product, respectively, are contained in one cartridge. The number of the product A, B, and C contained in the cartridge is 15, 7, and 3, respectively. The number of each type of products to be stocked is determined based on the past sales ratio of each type of products. The determination part determines the number of stocks based on sales data or has the predetermined number of stocks. For example, the number of each type of products to be stocked may be determined to approach the sales ratio of each type of product. The number of stocks can be converted to a whole number by rounding the product of the sales ratio and the total number of stocks, for example.

A method for determining products to be stocked in the first row will be explained hereinafter. The first row can contain five products. The number of each of the product type A, B, and C in the first row is determined by the following process. The provisional number of each type of products to be stocked in the first row is determined based on the number of products containable in the first row (which is five in this example), the number of products containable in a cartridge (which is twenty-five in this example), and the number of each type of products contained in the cartridge. Specifically, the provisional number of each type of products is determined according to the following formula.

(the storage capacity of a row)×(the number of a specific type of products contained/the storage capacity of a cartridge) Product X 5×(15/25)=3.0 Product A 5×(7/25)=1.4 Product B 5×(3/25)=0.6 Product C The ratio of the provisional number of each type of products corresponds to the ratio of the number of each type of products to be stocked in the cartridge. Further, the provisional number of each type of products is converted to a whole number. In this example, the number is converted into a whole number by round-off.

Product A: 3, Product B: 1, Product C: 1

The whole number given is the determined number of each type of products to be stocked in the first row. Thus, the number of the product A, B, and C to be contained in the first row is 3, 1, and 1, respectively, and the total is 5 (as shown in FIG. 14). As the ratio of the number of each type of stock products, (the number of a specific type of products contained/the storage capacity of a cartridge) in the above formula may be replaced with the ratio of past sales. Further, in the whole number conversion, the round-off process may be replaced with the following process; that is, the process first rounds down decimal numbers, and if it results in that the total number of products is less than the storage capacity of a row, it further rounds up (which is, adds 1 to) each stock numbers in descending order of the decimal numbers rounded. This is the same for the following explanation.

Next, a process for determining products to be stocked in the second row will be explained hereinafter. The stock products in the second row are determined based on the number of products containable in the first and second rows, the number of products containable in a cartridge, the number of each type of products contained in the cartridge, and the determined number of each type of products in the first row which is the preceding row. The number of each type of products to be contained in the second row can be determined so that the total number of a specific type of products contained in the first and second rows with respect to the total number of products containable in the first and second rows approaches the ratio of the number of products placed into the cartridge. For example, the provisional number of each type of products to be stocked is determined according to the following formula:

(the storage capacity of two rows)×(the number of a specific type of products contained/the storage capacity of a cartridge)−(the number of a specific type of products contained in the preceding row) Product X 2×5×(15/25)−3=3.0 Product A 2×5×(7/25)−1=1.8 Product B 2×5×(3/25)−1=0.2 Product C Further, the number of each type of products to be stocked is converted into a whole number. In this example, the number is converted into a whole number by round-off.

Product A: 3, Product B: 2, Product C: 0

Therefore, the number of the product A, B, and C to be contained in the second row is 3, 2, and 0, respectively, and the total is 5 (as shown in FIG. 14).

Now, product stocking in the third row will be explained. The number of each type of products to be contained in the third row can be determined by the similar process to the second row. Instead of the number of each products in the first row, the number of each products in the second row is used. The provisional number of each type of products is determined according to the following formula:

2×5×(15/25)−3=3.0 Product A

2×5×(7/25)−2=0.8 Product B

2×5×(3/25)−0=1.2 Product C

Further, the number of each type of products is converted into a whole number. In this example, the number is converted into a whole number by round-off.

Product A: 3, Product B: 1, Product C: 1

Therefore, the number of the product A, B, and C to be contained in the third row is 3, 1, and 1, respectively, and the total is 5 (as shown in FIG. 14). The number of each type of products in the fourth and fifth rows can be determined in the similar process. The above process allows uniform placement of each type of products into cartridges according to the ratio of the number of stocks.

Now, a process for determining the arrangement of products in a given row will be explained with reference to FIG. 15. In the arrangement determination process in this embodiment, if a product Z which is a product not included in the preceding row (the Nth row) is included in the next row (the (N+1)th row), a product which is most likely to be selected is placed in front of the product Z. The second row in FIG. 15 includes products A and B. The third row which is the row behind the second row includes a product C which is not included in the second row. Since the product A is most likely to be selected in the second row, the product A is placed in front of the product C. In the fourth row as well, the product A is placed in front of the product C in the fifth row by the similar process. This arrangement allows effective selling of products.

The number of rows in a cartridge and the capacity of a row are not limited to those described above. Those skilled in the art may easily apply those described above not only to the determination of stock products in cartridges, but also to the determination of stock products in the entire vending machine or in a specific storage area of the vending machine. It is also possible in determining the number of each type of products in a specific row to use the number of products in a row before the row immediately before the specific row, instead of the number of products in the row immediately before the specific row. The use of the number of products in a plurality of forward rows is also possible. It is further feasible to determine the number of stock products separately from sales number and then determines the products to be stocked according to the above process.

In the case of providing a priority area in the product storage area of the vending machine, stock products are determined in accordance with the number of products contained in the priority area. Even if the sales of some product are few, it is preferred that one or some of the storage cartridges within the priority area contain the product. Predetermining the arrangement of products in a cartridge allows effective selling of products. For example, placing some of the products with few sales in such a position that dispenses the product early increases the variety of products in the vending machine at some point.

Stocking the vending machine based on sales data of products contributes to increase product sales and reduce unsold products. Further, if a cartridge is capable of dispensing not only a product at the front, but also products in the back rows such as the second or third row, it is feasible to place promotional products such as new products into cartridges. Presenting the new products as a free gift allows promotions of the new products. In this invention, a single storage compartment of the vending machine contains a plurality of types of products, thus achieving effective selling of products.

INDUSTRIAL APPLICABILITY

As described in the foregoing, the vending machine according to the present invention is used for the sales of a plurality of types of products.

The invention claimed is:

1. A vending machine for vending a plurality of products, comprising:

a selection unit for selecting and purchasing products, the selection unit including a product selection part and a currency insertion part;

a plurality of storage compartments, each of which comprises a mechanically detectable identifier, and containing a plurality of types of products selectable by the selection unit;

a plurality of product identification sub-units for identifying a type of each product to be dispensed first from the plurality of storage compartments, wherein at least one product identification sub-unit is located within each of the storage compartments; and a determination unit for determining a product to dispense based on a result of identification by the product identification sub-unit in response to selection by the selection unit.

2. The vending machine according to claim 1, wherein the plurality of storage compartments comprise storage compartments preselected from storage compartments of the vending machine to preferentially dispense products.

3. The vending machine according to claim 2, wherein the vending machine previously cools and/or heats only a portion of the storage compartments selected from the storage compartments of the vending machine, and the storage compartments preferentially dispensing products are included in the selected storage compartments previously cooled and/or heated.

4. The vending machine according to claim 2, wherein the vending machine dispenses products only from the storage compartments preferentially dispensing products.

5. The vending machine according to claim 1, wherein the determination unit determines a product to dispense based on a result of identification by the product identification sub-unit and a predetermined product dispense rule in response to selection by the selection unit.

6. The vending machine according to claim 1, wherein, when more than one storage compartments of the plurality of storage compartments dispenses a product selected by the selection unit, a product to be dispensed is determined so as to increase a variety of products to be dispensed first from the plurality of storage compartments after a selected product is dispensed.

7. The vending machine according to claim 1, wherein, when more than one storage compartments of the plurality of storage compartments dispenses a product selected by the selection unit, a product is dispensed from a storage compartment in which a next product to be dispensed after the selected product is not included in products to be dispensed first from any other of the plurality of storage compartments.

8. The vending machine according to claim 1, wherein, when more than one storage compartments of the plurality of storage compartments dispenses a product selected by the selection unit, a product to be dispensed is determined based on past sales data and a product to be dispensed after the selected product.

9. The vending machine according to claim 8, wherein, when more than one storage compartments of the plurality of storage compartments dispenses a product selected by the selection unit, the selected product is dispensed from a storage compartment in which sales of a next product to be dispensed after the selected product are the same as or greater than sales of a next product to be dispensed after the selected product in any other storage compartments which can dispense the selected product.

10. The vending machine according to claim 1, wherein, when more than one storage compartments of the plurality of storage compartments dispenses a product selected by the selection unit, a product is dispensed from a storage compartment containing a largest variety of products.

11. The vending machine according to claim 1, wherein, when first products to be dispensed from the plurality of storage compartments do not include a product selected by the selection unit, the selected product is dispensed from a given storage compartment after a first product to be dispensed is dispensed from the given storage compartment.

12. The vending machine according to claim 11, wherein the first product to be dispensed from the given storage compartment is dispensed into a product delivery port.

13. The vending machine according to claim 11, wherein the first product to be dispensed from the given storage compartment is collected within the vending machine.

14. The vending machine according to claim 1, wherein each of the plurality of storage compartments is a container removable from the vending machine.

15. The vending machine according to claim 14, wherein the removable container contains products arranged according to a predetermined product arrangement pattern, and the product identification sub-units identify a type of each next product to be dispensed based on a product arrangement pattern applied to the removable container.

16. The vending machine according to claim 14, wherein, when more than one storage compartments of the plurality of storage compartments dispenses a product selected by the selection unit, a product is dispensed from a storage compartment which has been installed first.

17. A vending machine for vending a plurality of products, comprising:

a selection unit for selecting and purchasing products, the selection unit including a product selection part and a currency insertion part;

a storage compartment for containing a plurality of types of products selectable by the selection unit, the storage compartment having a mechanically detectable identifier;

a product identification sub-unit for identifying a type of a product to be dispensed first from the storage compartment, wherein at least a portion of the product identification sub-unit is located within the storage compartment; and a determination unit for determining a product to dispense based on a result of identification by the product identification sub-unit in response to selection by the selection unit.

18. The vending machine according to claim 17, wherein the storage compartment contains products arranged in a predetermined order, and the product identification sub-unit identifies a type of the first product to be dispensed by identifying the storage compartment containing a plurality of types of products.

19. The vending machine according to claim 17, wherein the product identification sub-unit identifies a type of the first product to be dispensed based on an identifier placed on the first product to be dispensed.

20. A method for determining a product to dispense in a vending machine having a plurality of storage compartments and a selection unit for selecting and purchasing products, the selection unit including a product selection part and a currency insertion part, the method comprising steps of:

selecting and purchasing a product, the selecting and purchasing being done by a purchaser by using the product selection part and the currency insertion part;

identifying a type of each product to be dispensed first from the plurality of storage compartments, each of the plurality of storage compartments comprising a mechanically detectable identifier and at least one product identification unit for identifying a type of a product to be dispensed first from the storage compartment, each of the storage compartments containing a plurality of types of products selectable in the selecting step; and determining a product to dispense based on a result of identification in the identifying step in response to selection in the selecting step.

* * * * *